Jan. 20, 1970  G. H. BECKMAN ET AL  3,490,198
CARTON FORMING MACHINE

Filed May 22, 1967  10 Sheets-Sheet 1

INVENTORS
George Harold Beckman
and John Robert
by McDougall, Hersh, Scott
and Ladd
Attorneys

Jan. 20, 1970   G. H. BECKMAN ET AL   3,490,198
CARTON FORMING MACHINE

Filed May 22, 1967   10 Sheets-Sheet 9

United States Patent Office 3,490,198
Patented Jan. 20, 1970

3,490,198
CARTON FORMING MACHINE
George Harold Beckman, Lowell, Ind., and John Robert, Chicago, Ill., assignors to Globe Industries, Inc., Chicago, Ill., a corporation of Delaware
Filed May 22, 1967, Ser. No. 640,109
Int. Cl. B65b 11/20, 49/14, 51/02
U.S. Cl. 53—64        22 Claims

ABSTRACT OF THE DISCLOSURE

A carton for packaging metal siding or the like, said carton comprising a rectangular bottom panel, a first side panel folded upwardly from the bottom panel, a top panel folded laterally from said first side panel, a second side panel folded upwardly from the opposite side of the bottom panel, a closure flap folded downwardly from the top panel and against the second side panel, and a ribbon adhesive for joining the closure flap to the second side panel, and end walls inserted in the ends of the carton, each end wall having upwardly projecting flanges which are stapled or otherwise secured to the various panels. A method of forming a carton, comprising the steps of placing a stack of metal siding, or some other object to be packaged, on a carton blank having three flaps projecting in one direction from the stack, and a fourth flap projecting in the opposite direction, folding said first flap upwardly along one side of the stack, folding said second flap laterally across the top of the stack, applying adhesive to the lower side of said fourth flap, folding said fourth flap upwardly along the opposite side of the stack, folding the third flap downwardly against the adhesive on said fourth flap, and mounting end walls in the open ends of the carton. A machine for forming a carton around a stack or other object, said machine comprising means for receiving a flat carton blank and a stack positioned thereon so that three flaps of the blank project from the stack in one direction while a fourth flap projects therefrom in the opposite direction, a transfer device for moving the blank and the stack laterally, a conveyor for receiving the blank and the stack from the transfer device, said conveyor including means for longitudinally advancing the blank and the stack, means preferably including a swingable folding member positioned along the conveyor for folding the first and second flaps so that the first flap extends upwardly along one side of the stack while the second flap is folded across the top of the stack, means disposed along the conveyor for applying a stripe of adhesive to the lower side of the fourth flap, means for folding the fourth flap upwardly along the other side of the stack, means for folding the third flap downwardly against the fourth flap, means for pressing the second flap against the top of the stack, means for pressing the third flap against the fourth flap so that the adhesive will form a bond therebetween, and means for moving the carton laterally off the conveyor.

---

This invention relates to a carton which is especially well adapted for packaging aluminum, steel, or other metal siding, but is also advantageous for many other applications. The invention also relates to a new and improved method of forming and closing such a carton. Furthermore, the invention relates to a new and improved machine for forming and closing the carton.

Metal siding is generally made in elongated panels, 8 to 16 feet in length, to simulate wood siding boards. It has been the practice to package a stack of several metal siding panels in a carton made of corrugatetd cardboard. The prior cartons have generally been closed at the top by overlapping top flaps which are stapled together. The ends of the cartons have generally been closed by overlapping and flaps which are stapled together. It has been the general practice to fold and close the cartons manually.

The prior cartons have the disadvantage that they do not stack evenly but produce a stack which leans in one direction so that it is unstable. The uneven stacking is caused by the overlapping top closure flaps of the cartons. Because of such uneven stacking, characteristics of the prior cartons, the stacks of cartons tend to topple easily, with resulting damage to the siding during storage and shipment.

The present invention provides a carton which is closed along one side in such a manner that the cartons will stack evenly, without any tendency to lean or topple. The carton of the present invention preferably has a bottom panel, a first side panel folded upwardly from the bottom panel, a top panel folded across the top of the stack from the first side panel, a second side panel folded upwardly from the opposite side of the bottom panel, a closure flap folded downwardly from the top panel, and an adhesive ribbon or other means for joining the closure flap to the second side panel. The open ends of the carton are preferably closed by end walls having outwardly projecting flanges which are adapted to be inserted into the open ends of the carton. The flanges are stapled or otherwise secured to the various panels. This construction has the additional advantage that the ends of the siding are protected by the projecting end portions of the panels, to which the flanges of the end walls are secured.

The present invention also provides a new and improved method of forming and closing the carton, preferably involving the steps of placing a stack of metal siding, or some other object to be packaged, upon the bottom panel of the flat carton blank, folding the first side panel upwardly from the bottom panel, folding the top panel across the top of the stack, applying adhesive to the lower side of the second side panel, folding the second side panel upwardly, folding the closure flap domnwardly, and pressing the closure flap against the adhesive on the second side panel. The end walls are then preferably inserted and secured to the panels.

Furthermore, the present invention provides a new and improved carton forming machine, which preferably comprises means for receiving a flat carton blank and a stack of siding or the like positioned thereon, a transfer device for moving the blank and the stack laterally, a conveyor for perceiving the stack and the blank from the transfer device, the conveyor including means for longitudinally advancing the stack and the blank, means preferably including a swingable forming member disposed along the conveyor for folding the first side panel upwardly and then folding the top panel over the stack, means along the conveyor for applying adhesive to the lower side of the second side panel, means for folding the second side panel upwardly, means for folding the closure flap downwardly, means for pressing the top panel against the top of the stack, means for pressing the closure flap against the second panel so that the adhesive will form a bond therebetween, and a device for moving the carton laterally off the conveyor.

Further objects and advantages of the present invention will appear from the following description, taken with the accompanying drawings, in which.

Figures 1, 2:
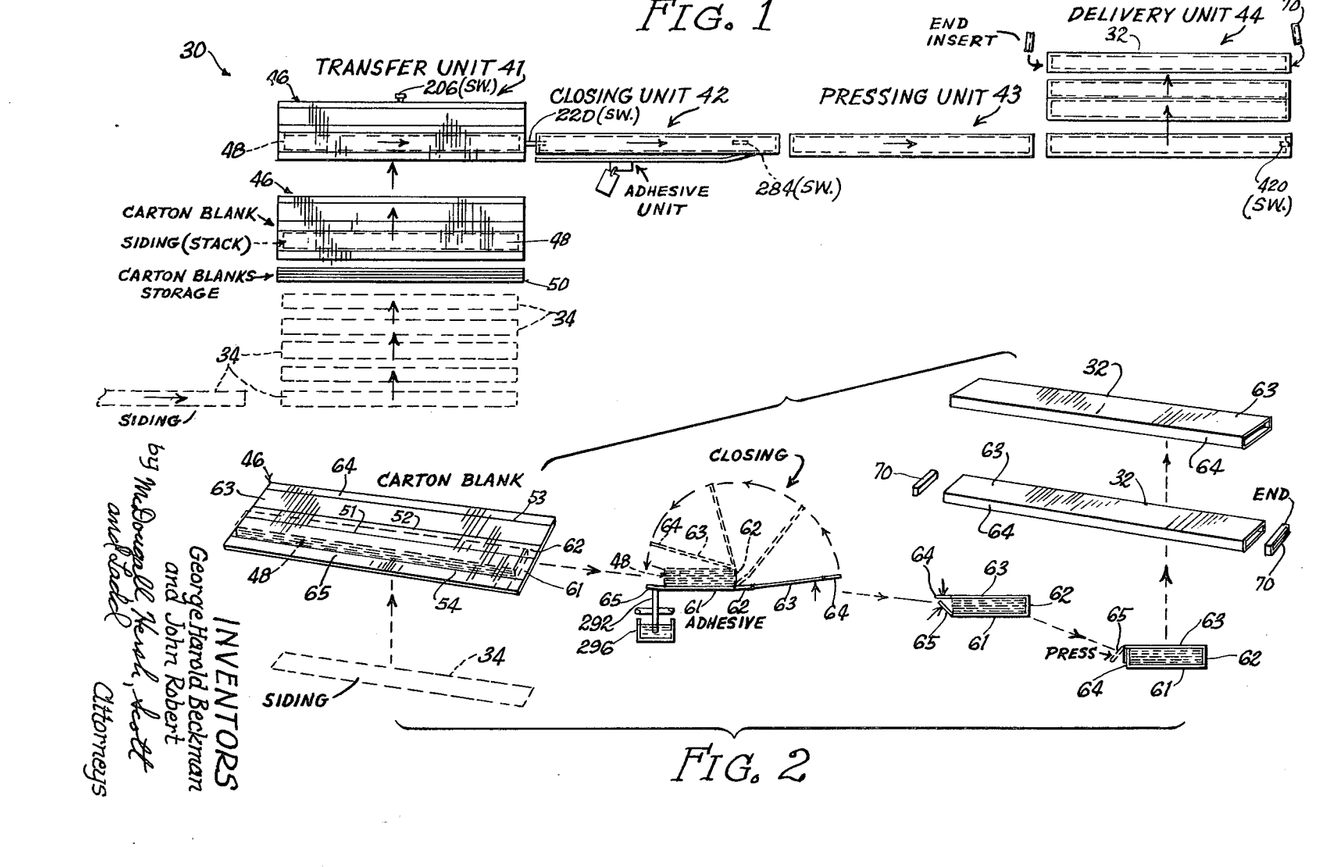
FIG. 1 is a diagrammatic plan view illustrating the general layout of a machine to be described as an illustrative embodiment of the invention.
FIG. 2 is a diagrammatic sequence view showing the successive operations involving the forming and closing of the carton.

As already indicated, FIG. 1 illustrates a general layout of a machine 30 for forming and closing a carton 32. The carton 32 will find many uses, but is especially well adapted for packaging metal siding panels 34, made of aluminum, steel or the like. Several of the siding panels 34 are stacked, and then are enclosed within one of the cartons 32.

Generally, the machine 30 may be considered in terms of four units, comprising a transfer unit or feeder 41, a closing unit 42, a pressing unit 43, and a delivery unit 44. Details of the transfer unit 41 are shown in FIGS. 3–8. The closing unit 42 is shown in detail in FIGS. 9–14. Details of the pressing unit 43 are shown in FIGS. 15–20. FIGS. 21–24 show details of the delivery unit 44.

The carton and the method of the present invention are also illustrated in a general way, in FIGS. 1 and 2. Initially, several of the siding panels 34 are placed on a flat carton blank 46 to form a stack 48. The siding panels 34 may be stacked in any suitable manner, either manually or by a mechanical feeder. A storage rack or magazine 50 is preferably provided to hold a stock of the carton blanks 46. The carton blanks 46 may be fed from the rack 50 in any suitable manner, either manually or mechanically.

It is preferred to connect the carton-forming machine 30 directly with the machine which manufactures the siding panels 34. In this way, the siding panels will arrive at the machine 30 in a continuous stream, as illustrated in FIG. 1.

It will be seen that the panels 34 are transported longitudinally to a position opposite the machine 30, and then are moved transversely to a position from which they may be stacked conveniently on the carton blank 46.

The carton blank 46 is scored along four lines 51, 52, 53, and 54 to provide five panels, comprising a bottom panel 61, a first side panel 62, a top panel 63, a closure flap 64, and a second side panel 65.

The stack 48 of siding is placed upon the bottom panel 61. It will be seen that the stack 48 is substantially rectangular in shape. The stack may be regarded as a rectangular object to be packaged. Of course, the carton may be employed to package other similar objects, if desired.

The flat carton blank 46 and the stack 48 are preferably moved transversely, and then longitudinally as indicated in FIG. 1. During the longitudinal movement, the carton blank 46 is folded and closed. It will be seen that the three panels 62, 63, and 64 are folded upwardly and over the stack 48. Thus, the first side panel 62 is folded upwardly along one side of the stack 48. The top panel 63 is then folded across the top of the stack.

During the longitudinal movement the adhesive is preferably applied to the lower side of the second side panel 65 of the carton blank 46. As shown, the adhesive is preferably applied in a continuous stripe or ribbon.

The second side panel 65 is then preferably folded upwardly along the other side of the stack 48. Then, the closure flap 64 is folded downwardly against the side panel 65. The closure flap 64 is pressed against the side panel 65 so that the adhesive will form a bond therebetween. At the same time, the top panel 63 is preferably pressed against the stack so that the carton will be formed in a rectangular shape, with the stack 48 snuggly received therein. It is preferred to emply a hot-melt type of adhesive, so that the adhesive will quickly form a permanent bond by cooling between the panels 64 and 65. However, other suitable types of adhesive may be employed. Moreover, other means, such as staples, may be employed to close the carton.

At this point, the carton is closed, except for its open ends. It is preferred to close the ends by inserting end closure members 70 into the open ends of the carton. The end members 70 are then secured to the carton by suitable means, such as staples.

Figure 25:
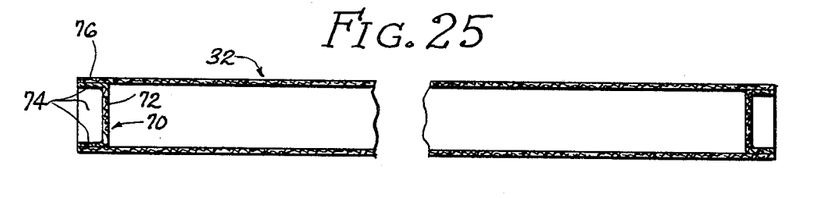
FIG. 25 is a vertical section taken longitudinaly through the completed carton.

As shown in FIG. 2 and also in FIG. 25, each end closure member 70 preferably employs an end wall 72 with four flaps 74 folded outwardly therefrom. The flaps 74 engage the inner sides of the panels 61, 62, 63, and 65 and may be stapled thereto. Like the rest of the carton 32, the end closure members 70 are preferably made of corrugated cardboard or the like. It will be seen that the end walls 72 are recessed into the ends of the carton 32, so that portions 76 of the carton 32 project beyond the end walls 72 at both ends of the carton. These projecting portions 76 protect the ends of the siding from damage due to possible rough handling of the loaded cartons.

The end closure members 70 may be inserted either manually or mechanically into the open ends of the carton 32. Moreover, the stapling may be done either manually or mechanically.

Figures 26, 27, 28, 29:
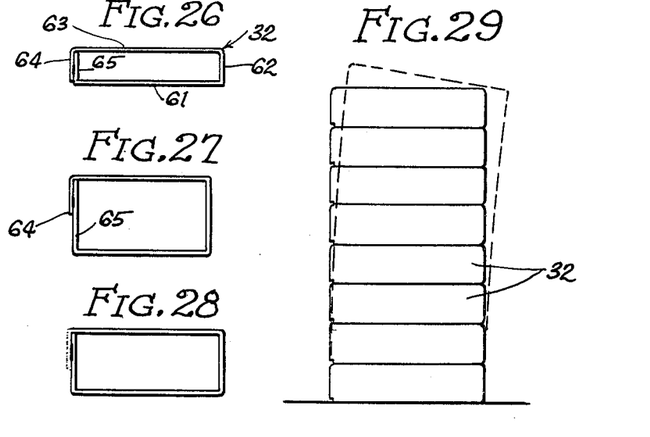
FIG. 26 is a vertical section taken transversely through the completed carton.
FIGS. 27 and 28 are views similar to FIG. 26, but showing modified cartons, which differ in height from the carton of FIG. 26.
FIG. 29 is an elevational view showing the manner in which the cartons may be stacked evenly, without any tendency to lean.

The finished carton 32 is shown in FIG. 26. It will be understood that the carton may be formed in various sizes. FIGS. 27 and 28 illustrate such variations in the sizes of the carton. In FIG. 27, the carton is taller and narrower than in FIG. 26. FIG. 28 illustrates a carton which is taller than shown in FIG. 26 but of about the same width. It will be seen that the height of the carton is determined by the height of the side panels 62 and 65. However, the closure flap 64 is preferably made about the same in depth regardless of the height of the carton. To save material, the closure flap 64 is only made deep enough to provide a good overlap along the upper portion of the side panel 65.

It will be seen that the cartons 32 are rectangular in cross section, with flat bottom and top panels 61 and 63. Thus, the cartons 32 may be stacked evenly to form a straight stack, as shown in FIG. 29. The stack of cartons does not have any tendency to lean in either direction, so that the problem encountered with the prior cartons is overcome. In FIG. 29, a leaning stack, typical of the prior cartons, is shown in broken lines, for comparison with the straight and even stack of the cartons 32. It will be evident that the cartons 32 may be stacked to a greater height with greater stability than heretofore.

Figure 3:
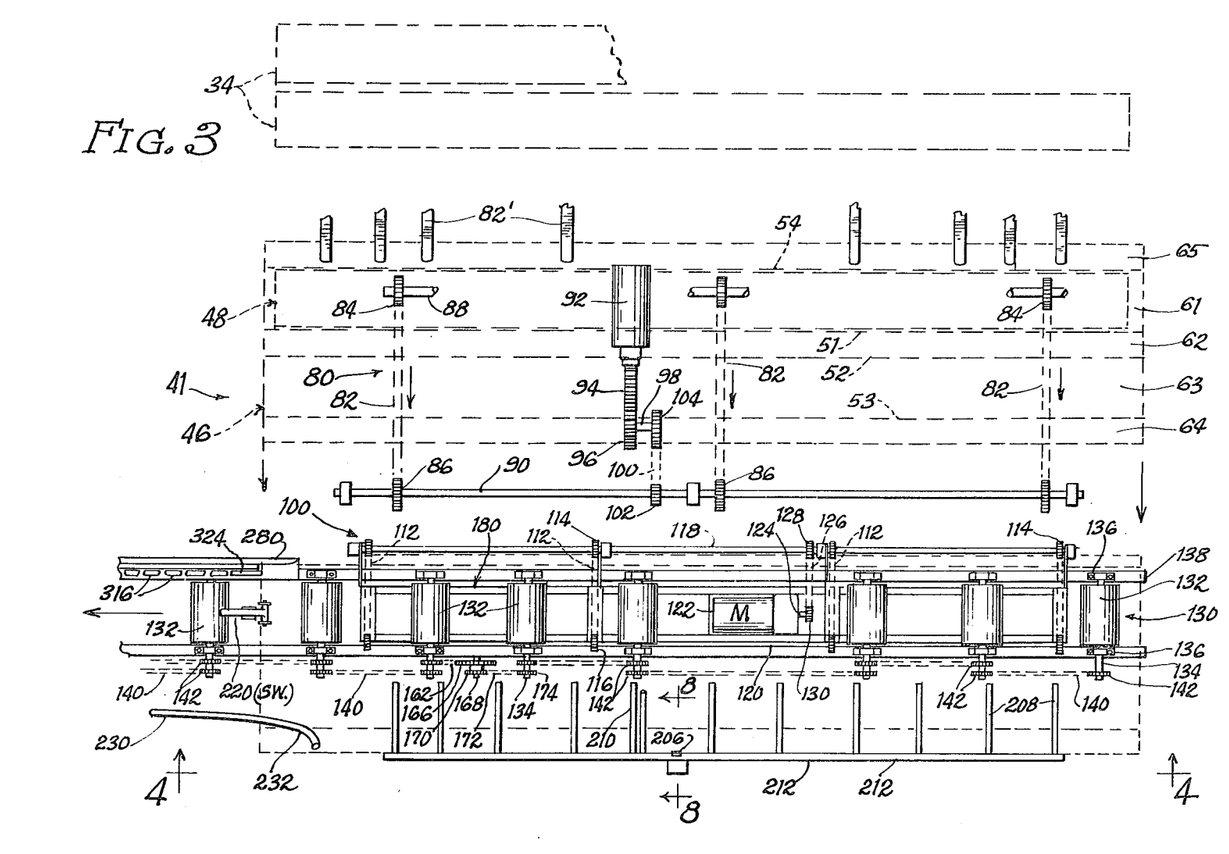
FIG. 3 is a diagrammatic plan view showing the transfer device for loading the carton blank and the stack of siding upon the conveyor.

FIG. 3 illustrates details of the transfer unit 41, which includes means for initially receiving the carton blank 46 and the stack or bundle 48 of siding panels. Such means include a first lateral feeding device or conveyor 80, upon which the carton blank 46 is placed initially. At this stage, the conveyor 80 is stationary. The siding panels 34 are then stacked upon the carton blank 46 to produce the stack or bundle 48. A plurality of inclined guide bars 82' are preferably provided to guide the carton blank 46 and the siding panels 34 on to the conveyor 80.

As illustrated, the conveyor 80 comprises a plurality of conveyor chains 82, three such chains being illustrated. It will be seen that each chain is threaded around two sprockets 84 and 86, secured to elongated shafts 88 and 90.

Power means are provided for selectively advancing the conveyor chains 82 so that the carton blank 46 and the stack 48 will be moved laterally. As shown, such power means comprise an air cylinder 92 which is adapted to rotate the shaft 90. Thus, a gear rack 94 is connected to the piston of the air cylinder 92. The rack 94 meshes with a rotatable pinion 96 mounted on a shaft 98. A drive chain 100 is strung round sprockets 102 and 104, which are mounted on the shafts 90 and 98.

The air cylinder 92 may be controlled ether manually or automatically. When a manual control is employed, the operator actuates the air cylinder 92 when the desired number of siding panels 34 have been stacked upon the carton blank 46. This actuation of the air cylinder 92 causes the chains 82 to advance sufficiently to move the carton blank and the stack off the conveyor 80. The cylinder 92 may then be returned to its original position by the operator.

In the illustrated transfer device 41, the conveyor 80 delivers the carton blank 46 and the stack 48 to another conveyor 110 which causes additional lateral movement thereof. As illustrated, the conveyor 110 comprises a plurality of conveyor chains 112, four such chains being illustrated. The chains 112 are threaded around sprockets 114 and 116 which are mounted on elongated shafts 118 and 120. In this case, the shafts 118 and 120 are continuously rotated, so that the chains 112 will be continuously circulated around the sprockets 114 and 116. The shaft 118 is adapted to be driven by power means, preferably comprising a motor 122 having a shaft 124. A drive chain 126 is threaded around sprockets 128 and 130 which are mounted on the shafts 118 and 124.

The second lateral conveyor 110 is adapted to deliver the carton blank 46 and the stack 48 to another conveyor 130 which advances the blank and the stack longitudinally. The conveyor 130 may be regarded as the main conveyor of the carton forming machine. As shown, the main conveyor comprises a large number of rollers 132, adapted to support and propel the carton blank 46 and the stack 48. Preferably, the rollers 132 are covered with rubber, or some other similar material, for frictionally driving the carton blank 46.

It is preferred to rotate the rollers 132 continuously, so that the carton blank will be propelled longitudinally as soon as it is deposited upon the rollers 132. As shown, each roller 132 has a shaft 134 mounted on bearings 136 which are supported by a frame 138. The rollers 132 are driven by means of a series of chains 140 which are threaded around sprockets 142 on the roller shafts 134.

Power means are provided to drive the rollers 132. As shown, in FIG. 15 such power means comprise a motor 144 which is located on the pressing unit 43 of the machine. The conveyor 130 extends along the transfer unit 41, the closing unit 42, the pressing unit 43, and the delivery unit 44. The illustrated motor 144 has a shaft 146 which supports a pulley 148. A belt 150 is strung around the pulley 148 and another pulley 151, which is mounted on a shaft 152. A drive chain 154 is employed to connect the shaft 152 to one of the roller shafts 134. It will be seen that the chain 154 is threaded around sprockets 156 and 158 on the shafts 134 and 152.

It is preferred to drive the first few rollers 132 at a relatively low speed, while driving the other rollers at a higher speed. In this way, the carton blank 46 and the stack 48 are accelerated gradually in a longitudinal direction, so that abrupt acceleration is avoided. Such abrupt acceleration tends to disturb the stack 48. As shown to best advantage in FIG. 4, a speed reducing drive 160 is preferably connected between the first few rollers and the remaining rollers 132. As shown, the drive 160 is connected between the fifth and sixth rollers 132. The illustrated drive 160 comprises a drive chain 162 which is strung around a small sprocket 164 and a large sprocket 166. The small sprocket 164 is mounted on the shaft 134 for the sixth roller 132. The large sprocket 166 is mounted on a shaft 168, which also carries a small sprocket 170. A drive chain 172 is threaded around the sprocket 170 and another small sprocket 174 on the shaft for the fifth roller 132. The drive 160 may reduce the speed at the ratio two to one so that the first five rollers 132 are driven at one half the speed of the other rollers in the conveyor 130.

To provide for the transfer of the carton blank 46 and the stack 48 from the lateral conveyor 110 to the longitudinal conveyor 130, it is preferred to arrange the conveyor 110 so that it is movable vertically. In this way, the carton blank 46 and the stack 48 may be lowered upon the continuously rotating rollers of the conveyor 130. As shown in FIGS. 4–7, the lateral conveyor 110 is mounted on a vertically movable frame 180. Vertical guides 182 are provided between the movable frame 180 and the stationary frame 138, as shown to best advantage in FIG. 7.

Figure 4:
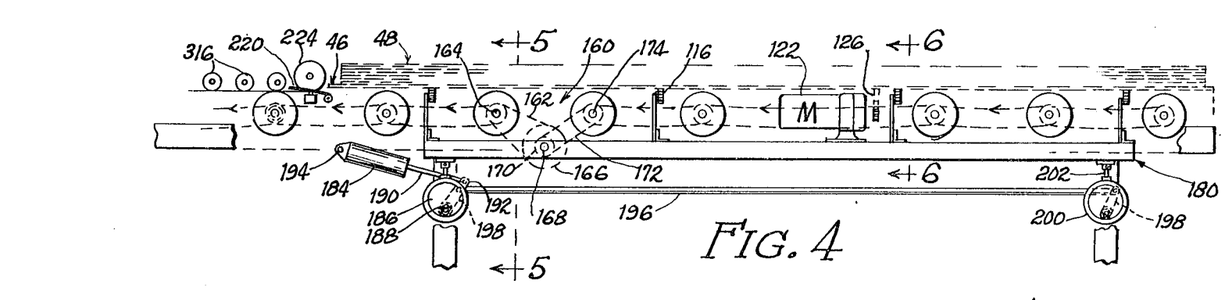
FIG. 4 is an elevational view taken generally as indicated at line 4—4 in FIG. 3.
Figures 5, 6, 7, 8:
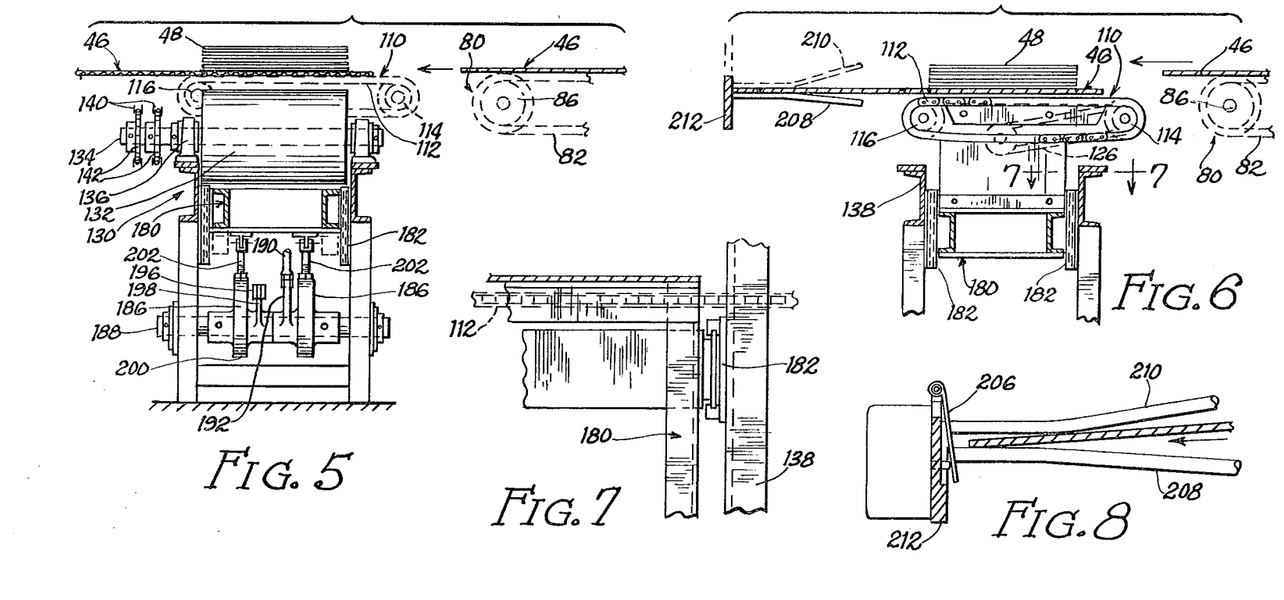
FIG. 5 is a fragmentary vertical section, taken generally along the line 5—5 in FIG. 4, and showing the carton blank and the stack just before they are lowered upon the conveyor.
FIG. 6 is a fragmentary section, taken generally along the line 6—6 in FIG. 4, and showing the carton blank and stack just after they are lowered upon the conveyor.
FIG. 7 is a fragmentary horizontal section, taken generally along the line 7—7 in FIG. 6.
FIG. 8 is a fragmentary enlarged vertical section, taken generally along the line 8—8 in FIG. 3.

Power means are preferably provided to operate the vertically movable frame 180. As shown in FIGS. 4 and 5, such power means preferably comprise an air cylinder 184 which operates a plurality of eccentric cams 186. Two pairs of the eccentric cams 186 are employed in the illustrated arrangement. The cams 186 are mounted in pairs on two shafts 188. The piston rod 190 of the air cylinder 184 is pivotly connected to an arm 192 which is secured to one of the shafts 188. A pivotal support 194 is provided for the body of the air cylinder 186. The shafts 188 are connected together by means of a linkage comprising a bar or rod 196 which is pivotly connected to arms 198 on the shafts 188.

Each of the illustrated eccentrics 196 is provided with a follower ring 200. A connecting rod 202 is connected to each ring 200. Each rod 202 is pivotally connected to the vertically movable frame 180. FIG. 5 shows the frame 180 in its raised position in which the carton blank 46 and the stack 48 are supported by the conveyor 110. FIG. 6 shows the movable frame in its lowered position in which the conveyor 110 has been moved downwardly below the level of the rollers 132 so as to transfer the carton blank 46 to the rollers.

The lowering movement of the conveyor 110 is preferably controlled automatically by the movement of the carton blank 46. Thus, the air cylinder 184 is preferably controlled by a switch 206 which is engaged and operated by the carton blank 46 when it is moved into the desired position over the conveyor 130 by the conveyor 110. The operation of the switch 206 actuates the air cylinder 184 so that the conveyor 110 is lowered. The carton blank 46 and the stack 48 are then picked up and advanced longitudinally by the rubber rollers 132.

Guide means are preferably provided to insure that the leading edge of the carton blank 46 will engage and operate the switch 206. As shown in FIGS. 3-6 and 8, such guide means preferably comprise a plurality of inclined guide bars or tines 208, adapted to engage and support the leading portion of the carton blank 46. The carton blank 46 is moved over the tines 208 by the conveyor 110. Another guide bar or tine 210 is preferably provided near the switch 206, to engage the upper side of the carton blank 46 so that the carton blank will be confined between the tines 208 and 210. It will be seen from FIGS. 6 and 8 that the tines 208 and 210 converge toward the switch 206. Thus, the tines 208 slope upwardly, while the tine 210 slopes downwardly. The tines 208 and 210 project laterally toward the longitudinal conveyor 130 from a longitudinal supporting bar 212. Means are preferably provided to insure that the conveyor 110 will be kept in its lowered position until the carton blank 46 and the stack 48 have been propelled away from the conveyor 110 by the longitudinal conveyor 130. As shown in FIGS. 3 and 4, such means preferably comprise a second switch 220 which is engaged and operated by the carton blank 46 shortly after it is started moving in a longtudinal direction by the conveyor 130. The operation of the switch 220 has the same effect as the switch 206. Thus, as long as the switch 202 is operated, the air cylinder 184 is actuated and the conveyor 110 is kept in its lowered position. After the trailing end of the carton blank 46 has moved off the switch 220, the air cylinder 184 is reversed so that the conveyor 110 is raised to its active position.

Figure 30:
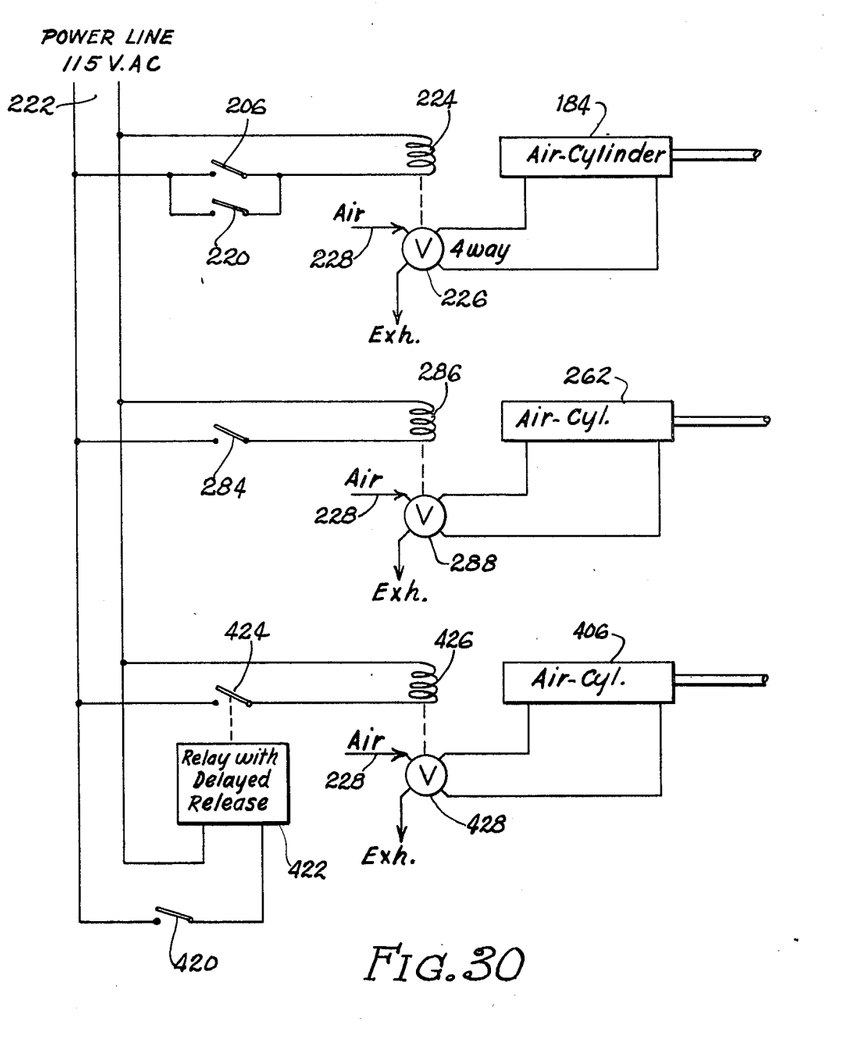
FIG. 30 is a circuit diagram showing details of the control system for the carton-forming machine.

As shown in FIG. 30, the switches 206 and 220 are connected in parallel, between a power line 222 and a solenoid 224, adapted to operate a four-way air valve 226. It will be seen that the valve 226 is connected between an air line 228 and the cylinder 184.

From the transfer unit 41, each carton blank 46 with the stack or bundle 48 of siding thereon is transported by the conveyor 130 through the closing unit 42 which is shown to best advantage in FIGS. 9-14. In the closing unit 42, the carton blank 46 is folded around the stack 48. Moreover, a ribbon or stripe of adhesive is applied to the lower side of the side panel 65.

Figures 9, 10:
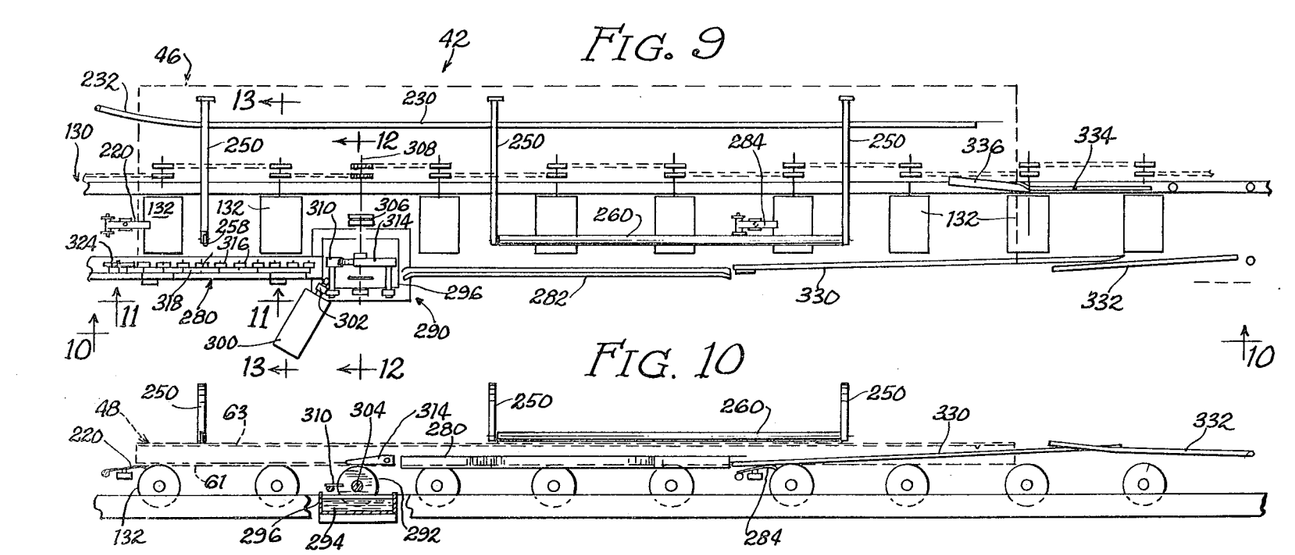
FIG. 9 is a diagrammatic plan view showing the mechanisms for folding the carton blank and applying adhesive thereto.
FIG. 10 is a diagrammatic elevational view, taken generally as indicated by the line 10—10 in FIG. 9.
Figure 11:
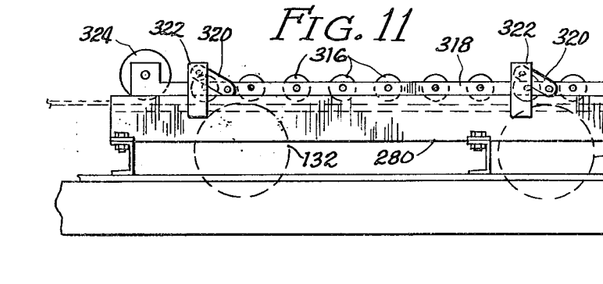
FIG. 11 is a fragmentary elevation taken as indicated by the line 11—11 in FIG. 9.
Figure 12:
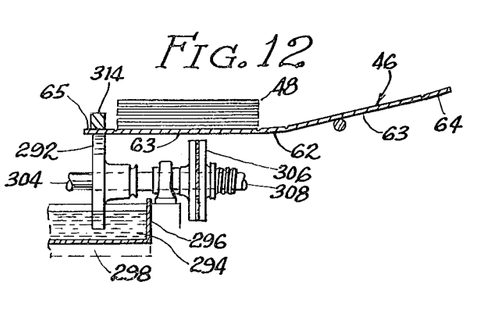
FIG. 12 is a fragmentary section, taken along the line 12—12 in FIG. 9 and showing details of the adhesive applicator.

In the closing unit 42, as shown in FIG. 9, the initial folding of the carton blank 46 is brought about by a guide bar 230 having an upwardly curving intial portion 232 over which the projecting panels of the carton 46 are moved. The upwardly curving portion 232 raises the projecting panels of the carton blank, as shown in FIG. 12, and thereby begins the folding operation. The main body of the guide bar 230 holds the carton in its raised position.

Figures 13, 14:
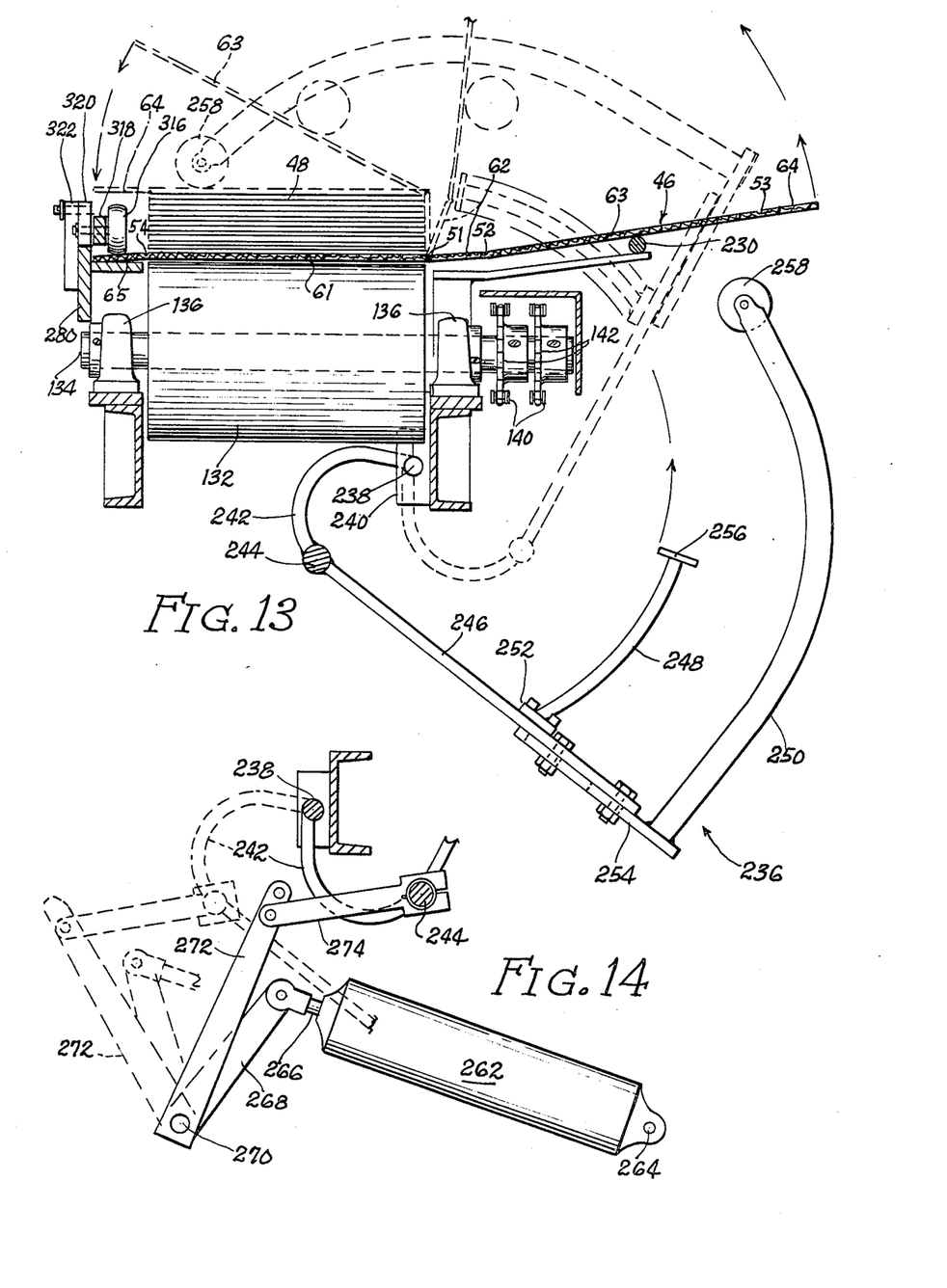
FIG. 13 is a section taken generally along the line 13—13 in FIG. 9, and showing details of the folding mechanism.
FIG. 14 is a fragmentary section showing details of the mechanism for operating the swingable folding member of FIG. 13.

Additional means are provided to complete the folding of the panels 63 and 64 of the carton blank 46, as shown in FIG. 13. Such means preferably comprise a swingable folding member 236 which moves upwardly and then over the stack 48. The swingable folding member 236 comprises a shaft 238 which is rotatably mounted in bearings 240. A plurality of curved arms 242 are connected between the shaft 238 and a longitudinal bar 244. It will be seen that the arms 246 afford support for curved push bars 248 and 250. As shown in FIG. 9, it is preferred to provide three of the push bars 250. Three of the push bars 248 may also be provided. The bars 250 are disposed along the conveyor 130 at longtudinally spaced intervals.

The push bars 248 are secured to the arms 246 by means of an adjustable clamp 252. Similarly, adjustable clamps 254 are employed to secure the push bars 250 to the arms 246. The clamp 252 and 254 make it possible to adjust the positions of the push bars 248 and 250.

The push bars 250 are adapted to engage the top panel 63 of the carton blank 46. When the folding member 236 is swung counterclockwise, the push bars 250 move upwardly and across the top of the stack so as to fold the top panel 63 against the top of the stack. The push bars 248 engage the side panel 62 and push it against the side of the stack 48.

It will be seen from FIG. 13 that a shoe 256 is mounted on the outer end of each push bar 248 to engage the side panel 62 of the carton blank. It will be understood that the carton blank 46 slides along the shoe 256 as the folding member 236 is swung to its actuated position as shown in broken lines in FIG. 13.

To engage the carton blank 46, a roller 258 is preferably mounted on the outer end of the first push bar 250. As shown in FIG. 9, an elongated roller 260 is preferably connected between the outer ends of the second and third push bars 250. The carton blank 46 slides along the rollers 258 and 260. The elongated roller 260 insures that the carton blank 46 will not catch upon the third push bar 250.

The swingable folding member 236 is actuated without interrupting the movement of the carton blank 46, on the conveyor 130. Power means are provided to actuate the folding member 236. As shown in FIG. 14, such power means preferably comprise an air cylinder 262 having a pivotal support 264. The piston rod 266 of the air cylinder 262 is pivotally connected to an arm 268 which is secured to a swingable shaft 270. Another arm 272 is secured to the shaft 270. A link or connecting rod 274 is connected between the arm 272 and the bar 244 on the swingable folding member 236. When the air cylinder 262 is contracted, as shown in full lines in FIG. 14, the folding member 236 is swung upwardly to its actuated position. When the cylinder 262 is extended as shown in broken lines in FIG. 14, the folding member 246 is swung downwardly due to its inactive or initial position.

Means are preferably provided to prevent the carton blank 46 from shifting laterally on the conveyor 130 when the carton blank is being folded around the stack 48. As shown in FIGS. 3 and 9, such means preferably comprise guide rails or bars 280 and 282 adapted to be engaged by the edge of the side panel 65. The guide rail 280 is opposite the first push bar 250, while the guide rail 282 is opposite the second push bar 250.

It is preferred to provide automatic control for the air cylinder 262. As shown in FIG. 9, the air cylinder is controlled by a switch 284 which is operated by the leading end of the carton blank 46, just before it passes the third push bar 250. The operation of the switch 284 actuates the air cylinder 262 so that the folding member 236 is swung upwardly and over the stack 48. After the entire carton blank 46 has passed over the switch 284, the cylinder 262 is reversed so that the folding member 236 is swung downwardly.

As shown in FIG. 30, the switch 284 is connected between the power line 222 and a solenoid 286 adapted to operate a fourway air valve 288. It will be seen that the valve 288 is connected between the air line 228 and the cylinder 262.

An adhesive applicator 290 is provided along the conveyor 130, to apply adhesive to the lower side of the side panel 65 of the carton blank. As shown to best advantage in FIGS. 9 and 12, the adhesive applicator 290 preferably comprises a roller or wheel 292 which is adapted to engage the lower side of the panel 65. The roller 292 dips into a pool 294 of the adhesive material. Such material is preferably of the hot-melt type, which is solid at room temperature, but is melted for use by heating it to an elevated temperature. Thus, the pool of adhesive 294 is contained within a tank or trough 296 having a heater 298 for maintaining the adhesive in a liquid state. The heater 298 may be of any suitable type, but preferably it is electrically operated and thermostatically controlled.

As shown in FIG. 9, a preheating tank 300 is preferably provided adjacent the trough 296, to melt the adhesive before it is introduced into the trough 296. In this way, the temperature of the liquid adhesive in the tank or trough 296 may be closely regulated. The introduction of additional adhesive material into the tank 296 does not appreciably disturb the temperature regulation. The preheater 300 incorporates additional heating elements for melting the adhesive. A control valve 302 is preferably provided to regulate the flow of the liquid adhesive from the preheater 300 to the main tank 296.

It is preferred to provide a positive drive to rotate the adhesive applicator roller 292. As shown in FIGS. 9 and 12, the roller 292 is mounted on a shaft 304 which is coupled by means of a slip clutch 306 to a shaft 308. It will be seen that the shaft 308 is driven in the same manner as the shafts 134 of the conveyor rollers 132.

As the roller 292 is rotated, most of the adhesive is scraped off the roller by a scraper or doctor blade 310, shown in FIGS. 9 and 10. In this way, only a thin film of the adhesive material is applied to the carton blank by the roller 292.

The side panel 65 of the carbon blank 46 is held down against the adhesive applicator roller 292 by an adjustable hold down bar 314. As the carton blank approaches the bar 314, the panel 65 is pressed downwardly by a series of rollers 316, shown to best advantage in FIGS. 11 and 13. In the illustrated construction, the rollers 316 are mounted on a movable supporting bar 318 so that the weight of the rollers 316 and the bar 318 is applied to the carton panel 65. The illustrated bar 318 is supported by a pair of links 320. One end of each link 320 is pivotally connected to the bar 318. The other end of the ring is pivotally mounted on a stationary support 322. The hold down rollers 316 may all be of the same size, but a larger roller 324 is preferably mounted on the supporting bar 318 in advance of the rollers 316, to insure that the carton panel 65 will move smoothly under the rollers 316. The rollers 316 and 324 insure that the carton panel 65 is properly flattened and pressed downwardly before it engages the adhesive applicator roller 292.

Additional means are provided to fold up the side panel 65, after the adhesive has been applied thereto. As shown to best advantage in FIGS. 9 and 10, such means preferably comprise a slanting guide bar 330 which is engaged by the side panel 65 after the carton blank has moved past the adhesive applicator 290. The panel 65 moves over the slanting bar 330 which then lifts the panel 65 upwardly, as shown to best advantage in FIG. 17. In addition to slanting upwardly, the guide bar 330 converges toward the side of the stack 48 so as to push the panel 65 against the stack.

Figures 17, 18:
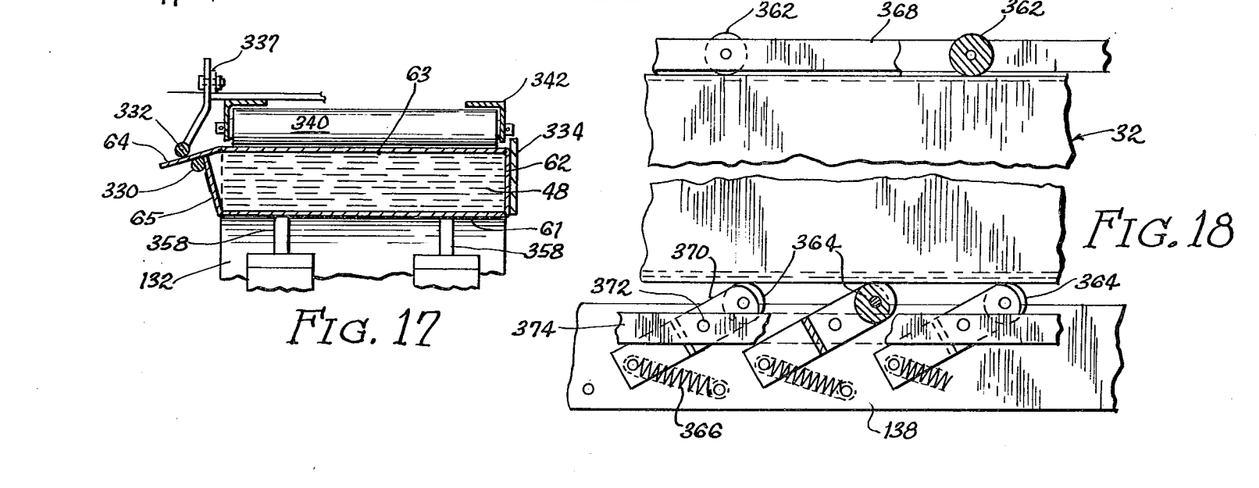
FIG. 17 is a fragmentary section, taken along the line 17—17 in FIG. 16, and showing details of the devices for folding the side panel and the closure flap of the carton.
FIG. 18 is a fragmentary horizontal section, taken generally along the line 18—18 in FIG. 16, and showing the rollers for pressing the sides of the carton.

Means are also provided to fold the closure flap 64 downwardly from the top panel 63. The closure flap 64 is folded downwardly against the side panel 65. As shown in FIGS. 9, 10, and 17 such means preferably comprise another slanting guide bar 332. The closure flap 64 moves under the guide bar 32 and then is folded downwardly by the downwardly inclined bar. In addition to slanting downwardly, the bar 332 converges toward the stack. As the side panel 65 and the closure flap 64 are being folded by the bars 330 and 332, the opposite side panel 62 is pressed against the stack 48 by the guide bar 334. The guide bars 330 and 332 are preferably round in cross section while the bar 334 is preferably rectangular. It will be seen that the bar 334 has an outwardly angling initial portion 336 for deflecting the side panel 62 against the stack.

It is preferred to mount the guide bar 330 and 332 in an adjustable manner. Thus, for example, as shown in FIG. 17, the guide bar 332 is supported by an adjustable clamp 337.

Means are preferably provided to press the top and side panels of the carton against the stack for a prolonged interval, to give the adhesive an opportunity to set so that it will form a secure bond between the side panel 65 and the closure flap 64. Such means are incorporated in the pressing unit 43, as illustrated in detail in FIGS. 15–20. The top panel 63 is pressed against the stack 48 by a series of rollers 340, mounted on an adjustable frame 342. The bottom panel 61 of the carton is supported by the conveyor rollers 132.

In the illustrated construction, a rack and pinion mechanism 344 is provided to adjust the position of the frame 342 so that the elevation of the rollers 340 may be changed. In this way, the machine may be adjusted to handle cartons of various heights. It will be seen that a plurality of gear racks 346 project upwardly from the frame 342. The racks 346 are engaged by pinions 348 mounted on a pair of shafts 350. A drive chain 352 is strung around sprockets 354 on the two shafts 350. In this way, the shafts may be rotated simultaneously. One of the shafts 350 is fitted with an operating crank 356. The top pressing rollers 340 insure that the top panel 63 of the carton will be pressed into a horizontal position while the adhesive is setting. In this way, the top panel will be truly level and horizontal, so that the finished cartons will stack evenly.

Figure 15:
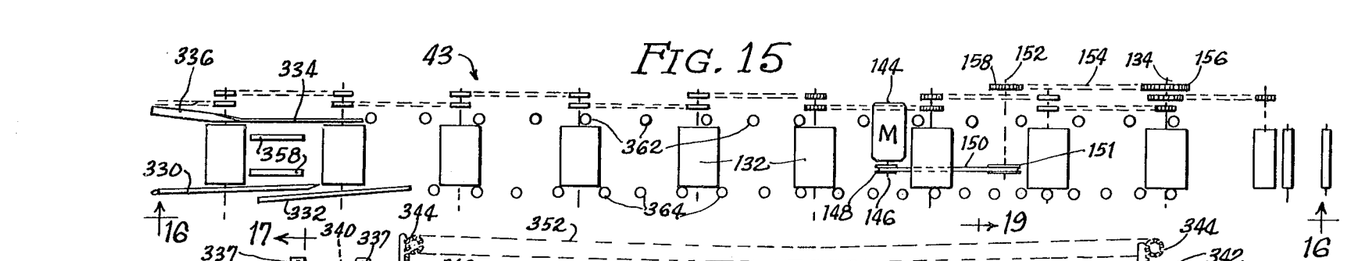
FIG. 15 is a diagrammatic plan view, showing the mechanisms for pressing the top and side panels of the carton while the adhesive is developing its bond.
Figure 16:
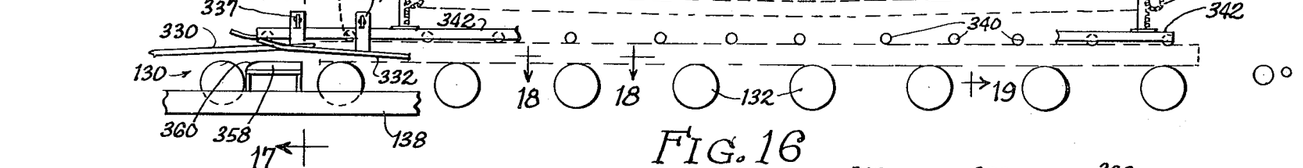
FIG. 16 is a diagrammatic elevation, taken generally along the line 16—16 in FIG. 15.

It is preferred to provide additional means to support the cartons, as they move under the top pressing rollers 340, so as to stabilize the carton and prevent it from tilting or shifting on the conveyor rollers 132. As shown in FIGS. 15 and 16, a plurality of supporting bars 358 are mounted substantially even with the upper extremities of the rollers 132 so as to support the cartons as they move under the top pressing rollers 340. The lower panel 61 of each carton is adapted to slide along the bars 358. It will be seen that the bars 358 are spaced downwardly from the first of the top pressing rollers 340. To guide the carton, the bars 358 are provided with rounded leading end portions 360. The bars 358 may be mounted on the frame 138 which supports the conveyor 130.

Figure 19:
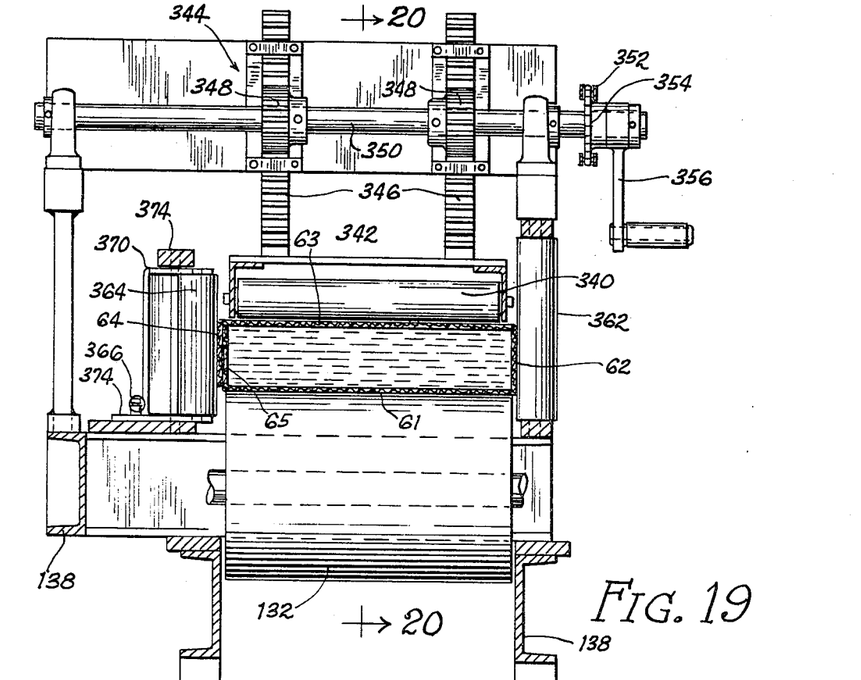
FIG. 19 is a vertical section, taken generally along the line 19—19 in FIG. 16, and showing details of the adjusting mechanism for the rollers which press the top of the carton.
Figure 20:
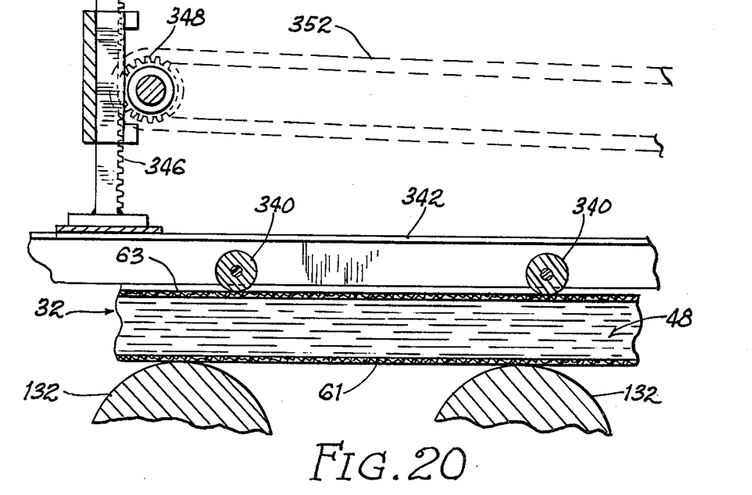
FIG. 20 is a vertical section, taken generally along the line 20—20 in FIG. 19.

As shown in FIGS. 16, 18, and 19, the side panels of the cartons are pressed by vertical rollers 362 and 364 on the opposite sides of the conveyor 130. As shown, the rollers 362 are stationary while the rollers 364 are movable and are pressed against the carton by means of springs 366. The rollers 362 are mounted on a stationary frame 368. Each of the rollers 364 is mounted on a movable frame or carriage 370 which is swingable about a pivot 372. A stationary frame 374 supports the pivots 372. The frame 374 may be mounted on the frame 138 which supports the conveyor 130. As shown, each spring 366 is connected between the corresponding swingable frame 370 and the stationary frame 138.

The pressing action of the stationary and movable rollers 362 and 364 holds the closure flap 64 against the side panel 65 so that the adhesive will form a bond therebetween. The rollers 362 and 364 also insure that the side panels 62, 64, and 65 will be vertical, so that the finished carton will be rectangular.

The details of the delivery unit 44 are shown in FIGS. 21–24. The cartons 32 pass from the pressing unit 43 to the delivery unit 44.

The delivery unit 44 comprises a conveyor 380 which is an extension of the main conveyor 130. It will be seen that the conveyor 380 comprises an initial roller 382 which is driven at substantially the same surface speed as the rollers 132 of the main conveyor 130. The roller 382 is mounted on a shaft 384 supported by bearings in a frame 386. As shown, a drive chain 388 is employed to drive the roller 382. The chain 388 is strung around sprockets 390 and 392. The sprocket 390 is on the shaft 134 of the last roller 132 of the main conveyor 130. The sprocket 392 is on the shaft 384 of the roller 382. Preferably, the roller 382 is rubber covered and thus is adapted to propel the cartons 32 along the conveyor 380.

It will be seen that the conveyor 380 also comprises a series of rollers 396 which are mounted for free rotation on the frame 386 but are not driven. The rollers 396 are preferably made of metal or the like and are relatively small in diameter. The rubber covered roller 382 is effective to propel the carton 32 along the train of rollers 396 which offer a minimum of frictional resistance.

The delivery unit 44 comprises a mechanism 398 for ejecting the cartons 32 transversely from the conveyor 380. The ejecting mechanism 398 is adapted to slide the cartons off the rollers 396.

The ejecting mechanism 398 preferably comprises a pusher 400 which is slideable transversely across the conveyor 380. The illustrated pusher 400 is in the form of a bar or rail which is adapted to engage one side of each carton 32. As shown, the pusher is mounted on a plurality of slides 402 which are in the form of sleeves, movable along guide bars 404. In this case, the slides 402 and the guide bars 404 are rectangular in cross section.

Figure 21:
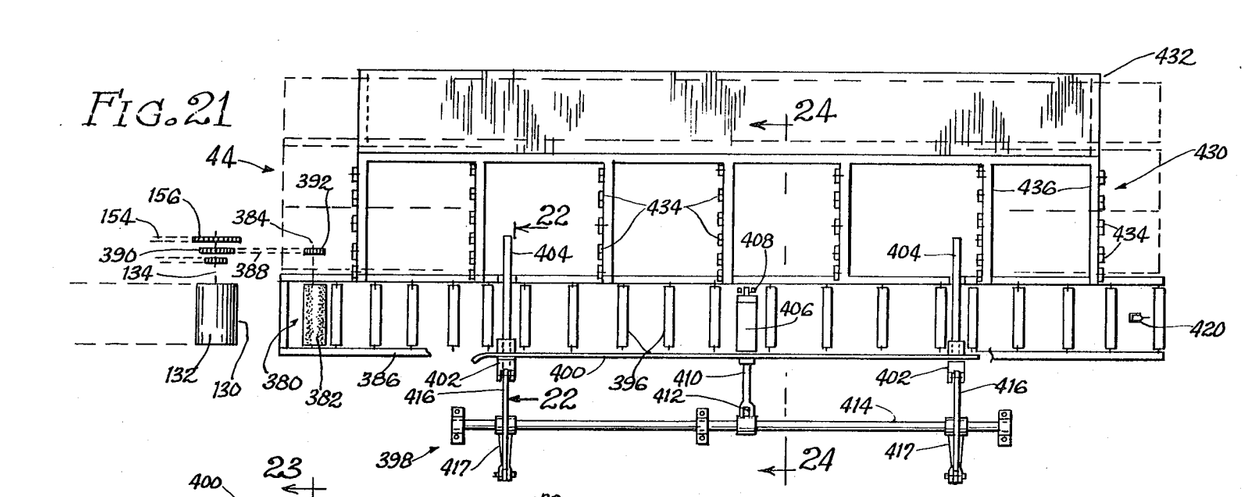
FIG. 21 is a diagrammatic plan view of the mechanism for moving the cartons laterally off the conveyor.
Figure 22:
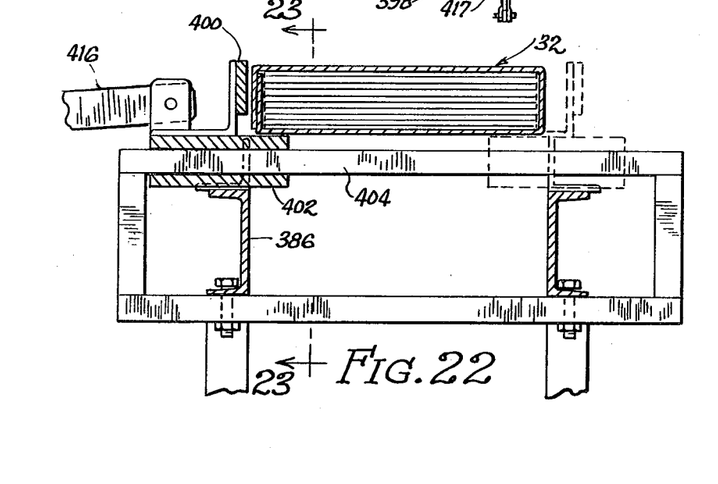
FIG. 22 is a vertical section taken generally along the line 22—22 in FIG. 21.
Figure 23:
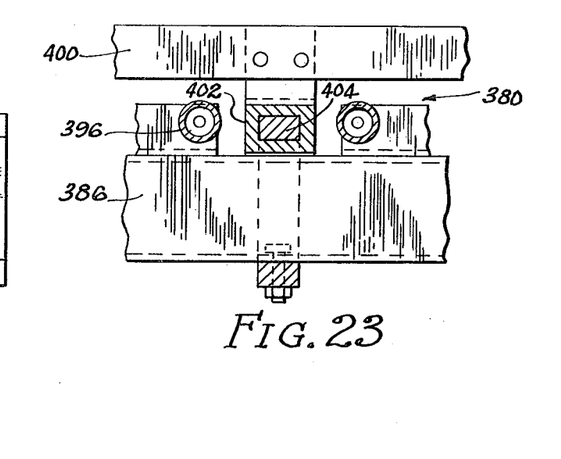
FIG. 23 is a fragmentary vertical section, taken generally along the line 23—23 in FIG. 22.
Figure 24:
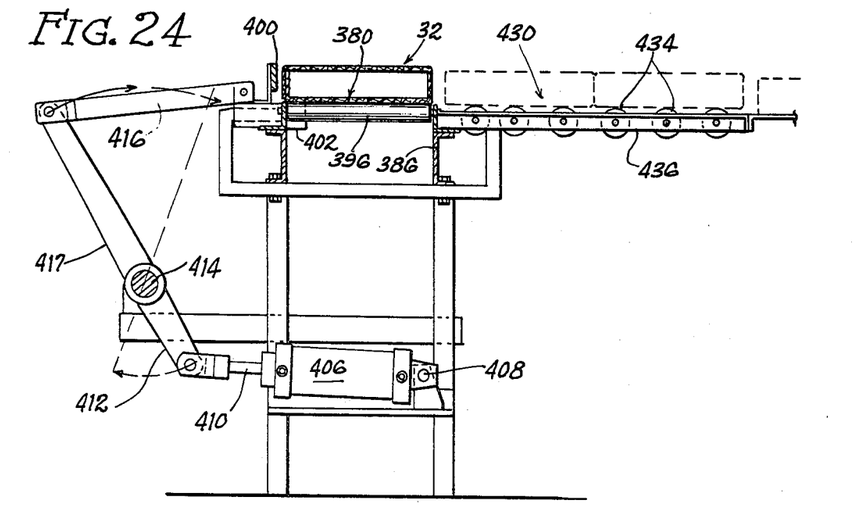
FIG. 24 is a vertical section, taken generally along the line 24—24 in FIG. 21.

Power means are preferably provided to operate the pusher 400. As shown in FIGS. 21 and 24, such power means comprise an air cylinder 406 which is mounted on a pivot 408 supported by the frame 386. The air cylinder 406 has a piston rod 410 which is pivotally connected to a lever arm 412, extending downwardly from a pivot shaft 414, mounted on the frame 386. The links 416 are connected between the pusher 400 and the upwardly extending lever arms 417 on the shaft 414. When the air cylinder 406 is extended, the pusher 400 is moved across the conveyor 380 so as to eject the carton 32 from the rollers 396. When the cylinder 406 is retracted, the pusher 400 is returned to its original position.

The operation of the air cylinder 406 is preferably controlled by the movement of the cartons 32 along the conveyor 380. As shown in FIG. 21, each carton is adapted to engage and operate a switch 420, mounted adjacent the far end of the conveyor 380, remote from the rubber covered roller 382. The operation of the switch 420 causes the air cylinder 406 to extend, so that the carton is pushed off the rollers 396.

As shown in the circuit diagram of FIG. 30, the control switch 420 is preferably connected between the power line and a time-delay relay 422 adapted to close a pair of contacts 424. The closure of the contacts 424 energizes a solenoid 426 which operates a four-way air valve 428, so as to extend the air cylinder 406.

The switch 420 returns to its open position as soon as the carton is pushed off the switch by the transverse movement of the pusher 400. To insure that the carton will be pushed entirely off the conveyor 380, the relay 422 is preferably of the type having delayed release so that the solenoid contacts 424 are kept in a closed position for a timed interval, after the switch 420 has opened.

The pusher 400 transfers the successive cartons from the longitudinal conveyor 380 to a transverse conveyor 420, which carries the cartons to a work platform 432.

The end closure members 70 are added to the cartons when they arrive at the work platform 432. The end closure members may be installed by workmen who also transfer the completed cartons from the work platform to an adjacent truck or the like, on which the cartons are stacked until a sufficient number have been accumulated to be carried away for storage or shipment. As previously described, the end closure members 70 may be inserted into the open ends of the cartons, and may then be stapled in place. Suitable mechanical equipment may also be provided to install the end closure members.

The transverse conveyor 430 preferably comprises a plurality of rollers 434, mounted on transverse frame members 436. It is not necessary to drive the rollers 434, because the pusher 400 is effective to move the cartons along the rollers 434 to the work platform 432.

The operation of the carton forming machine has already been described, but it may be helpful to offer a brief summary. As shown in FIGS. 1 and 3, the carton blank 46 is placed on the lateral feeding device or conveyor 80. The stack or bundle 48 of siding boards is then assembled on the carton blank 46. The operator then actuates the air cylinder 92 so as to advance the chains 82 of the conveyor 80.

The carton blank 46 and the stack 48 are thereby fed to the conveyor 110 which carries them transversely over the main conveyor 130. The conveyor 110 is continuously driven by the motor 122.

The carton blank 46 and the stack 48 are transferred from the lateral conveyor 110 to the main or longitudinal conveyor 130, by moving the conveyor 110 downwardly. The lowering movement of the conveyor 110 is controlled automatically by the movement of the carton blank 46. Thus, as the carton blank is moved laterally by the conveyor 110, it engages and operates the switch 206. In this way, the air cylinder 186 is actuated so as to lower the conveyor 110. In this way, the carton blank 46 is lowered upon the rubber covered rollers 132 of the conveyor 130. The rollers 132 are continuously driven and thus are effective to advance the carton blank 46 and the stack 48 along the conveyor 130.

The longitudinal movement of the carton blank 46 brings it against the switch 220, which is connected in parallel with the switch 206, and thus is effective to maintain the conveyor 110 in its lowered position, until the entire carton has moved over the switch 220.

The conveyor 130 carries the carton blank 46 and the stack 48 through the closing unit 42 and the pressing unit 43 to the delivery unit 44. In the closing unit 42, as shown in FIGS. 9 and 12, the panels 62 and 63 of the carton blank 46 are given an initial upward folding movement by the curved forming bar 230. The folding of the panels 62 and 63 is then completed by the swingable folding member 236, as shown in FIG. 13. The operation of the swingable folding member 236 is controlled automatically by the movement of the carton blank 46. Thus, the conveyor 130 causes the carton 46 to engage and operate the switch 284 so as to actuate the air cylinder 262, which swings the folding member 236 upwardly and over the stack 48.

While the side panel 62 and the top panel 63 are being folded, adhesive is applied to the side panel 65 by the applicator roller 292. The adhesive is preferably of the hot-melt type, which is melted for use and is adapted to set quickly after it has cooled for a few seconds. In the illustrated machine, the adhesive applicator roller 292 is positively driven. The side panel 65 of the carton blank 46 is held down against the roller 292 by the hold-down bar 314. The side panel 65 is guided under the bar 314 by the pressure rollers 316.

After the adhesive has been applied, the side panel 65 is folded upwardly by the inclined forming bar 330. The closure flap 64 is then folded downwardly from the top panel 63 by the forming bar 332.

In the pressing unit 43, pressure is applied to the carton both vertically and horizontally, so as to square up the carton, while also pressing the closure flap 64 against the adhesive on the side panel 65. The pressure is maintained for a sufficient interval of time to allow the adhesive to set.

The top panel 63 is pressed downwardly by the series of rollers 340. Meanwhile, the bottom panel 61 of the carton is supported by the conveyor rollers 132.

The side panels of the cartons are pressed by vertical rollers 362 and 364. The springs 366 are effective to press the rollers 364 against the adjacent side of the carton.

In the delivery unit 44, the carton 32 is propelled by the rubber covered roller 382, and is supported by the idler rollers 396. The carton engages and operates the switch 420 which actuates the air cylinder 406. In this way, the pusher 400 is advanced across the conveyor 380, so as to eject the carton from the conveyor. The time delay relay 42 then causes the pusher 400 to return to its initial position.

After being ejected from the conveyor 380, the cartons travel laterally along the rollers 434 of the conveyor 430, so that the carton is carried to the work platform 432. The end closure members 70 are then added to the cartons. The finished cartons may be stacked on a truck or the like, so that they may be carried away for storage and shipment.

It will be evident that the carton forming machine is controlled automatically, in response to the movement of the cartons along the machine. Thus, the carton is formed and closed without any particular attention from the operator. The operation of the carton forming machine is rapid, efficient, and economical.

Various other modifications, alternative constructions and equivalents may be employed without departing from the true spirit and scope of the invention, as exemplified in the foregoing description and defined in the following claims.

We claim:

1. A machine for forming a carton around a generally rectangular stack or other object,
   said machine comprising the combination of a horizontally oriented longitudinal conveyor,
   a feeder for depositing a flat carton blank and an overlying stack on said longitudinal conveyor with a side panel, top panel and first closure flap of the carton blank projecting laterally beyond the stack in one direction while a second closure flap projects beyond the stack in the opposite direction,
   first power means for operating said conveyor to propel the carton blank and the overlying stack longitudinally therealong,
   a swingable folder disposed along said conveyor and having a pivotal support with an axis substantially parallel to the longitudinal direction of said conveyor and substantially below the level of said carton blank,
   said folder having a skeletal frame with a first folding member thereon swingable about said pivotal support from an initial position below said top panel of said carton blank, then upwardly into engagement with said top panel and past one side of the stack, then across the top of the stack to a final position in which said top panel is folded against the top of the stack,
   said folder having a second folding member on said frame and swingable therewith about said pivotal support from an initial position spaced below said top panel of said carton blank, then upwardly into engagement with said side panel of said blank to a final position in which said side panel is folded against the side of the stack,
   said second folding member being at a shorter radial distance from the axis of said pivotal support than said first folding member,
   said second folding member being initially spaced substantially farther below said top panel than said first folding member,
   second power means for swinging said folder,
   an adhesive applicator for applying adhesive to one of the closure flaps of the carton blank,
   additional folding means for folding the second closure flap upwardly while folding the first closure flap downwardly with the adhesive therebetween to form the other side of the carton,
   and pressing means for pressing the closure flaps together so that the adhesive will form a bond therebetween.

2. A machine according to claim 1,
   in which said first folding member comprises a roller rotatably mounted on said frame for engaging the top panel of the carton blank.

3. A machine according to claim 1,
   in which said first folding member comprises an elongated roller bar for engaging the top panel of the carton blank,
   and means rotatably mounting said elongated roller bar on said frame for rotation about an axis substantially parallel to the axis of said pivotal support for said swingable folder.

4. A machine according to claim 1,
   including control means operable by the longitudinal movement of the carton blank along said conveyor for actuating said second power means so as to cause upward swinging movement of said folder.

5. A machine according to claim 1,
   including a switch disposed along said conveyor and engageable by the carton blank as it moves therealong for actuating said second power means to cause upward swing movement of said folder.

6. A machine according to claim 1,
   in which said frame of said folder comprises a plurality of generally radial arms,
   said first folding member comprising at least one roller mounted on said arms for rotation about a generally longitudinal axis.

7. A machine according to claim 1,
   including means connected between said first power means and said conveyor for continuously advancing said conveyor.

8. A machine according to claim 1,
   in which said feeder comprises a transverse conveyor disposed alongside the longitudinal conveyor for receiving the carton blank and the stack,
   and third power means for actuating said transverse conveyor to transfer the carton blank and the stack laterally to the longitudinal conveyor.

9. A machine according to claim 8,
   in which said third power means comprise a fluid power cylinder,
   and means for selectively actuating said fluid power cylinder.

10. A machine according to claim 1,
    in which said feeder comprises a transverse conveyor disposed alongside said longitudinal conveyor for receiving the carton blank and the stack,
    third power means for actuating said transverse conveyor to carry the carton blank and the stack over the longitudinal conveyor,
    said transverse conveyor having a transfer section which is shiftable between raised and lowered positions above and below the level of the longitudinal conveyor,
    fourth power means for shifting said transfer section to its lowered position to deposit the carton blank and the stack upon the longitudinal conveyor,
    and second control means operable by the movement of the carton blank on said transverse conveyor for actuating said fourth power means to cause the lowering movement of said transfer section.

11. A machine according to claim 10,
    in which said second control means comprises a second switch disposed along said transverse conveyor and operable by the movement of the carton blank therealong for actuating said fourth power means to cause the lowering movement of said transfer section.

12. A machine according to claim 10, including additional control means disposed along said longitudinal conveyor and operable by the movement of the carton blank therealong to maintain the actuation of said fourth power means until the carton blank has been moved from said transfer section by the longitudinal conveyor.

13. A machine according to claim 1, in which said feeder includes a first transverse conveyor disposed alongside the longitudinal conveyor for receiving the carton blank and the stack, a second transverse conveyor for receiving the carton blank and the stack from the first transverse conveyor to carry the carton blank and the stack over the longitudinal conveyor, a selectively operable power means for actuating said first transverse conveyor, continuously operable power means for actuating said second transverse conveyor, said second transverse conveyor being shiftable between raised and lowered positions, fourth power means for shifting said second transverse conveyor to its lowered position to deposit the carton blank and the stack on the longitudinal conveyor, and control means operable by the movement of said carton blank on said second transverse conveyor for actuating said fourth power means to cause the lowering movement of said second transverse conveyor.

14. A machine according to claim 13, in which said control means comprise a first control element disposed along said second transverse conveyor and operable by the movement of the carton blank therealong to actuate said fourth power means, and a second control element disposed along said longitudinal conveyor and operable by the longitudinal movement of the carton blank therealong for maintaining the actuation of said fourth power means until the carton blank has been moved away from said second transverse conveyor by the longitudinal conveyor.

15. A machine according to claim 1, in which said adhesive applicator comprises a device for applying adhesive to the underside of the second closure flap on the carton blank.

16. A machine according to claim 1, in which said adhesive applicator comprises a roller alongside the longitudinal conveyor and projecting upwardly to apply the adhesive to the underside of the second closure flap on the carton blank.

17. A machine for forming a carton around a generally rectangular stack or other object, said machine comprising the combination of a horizontally oriented longitudinal conveyor, a feeder for depositing a flat carton blank and an overlying stack on said longitudinal conveyor with a side panel, top panel and first closure flap of the carton blank projecting laterally beyond the stack in one direction while a second closure flap projects beyond the stack in the opposite direction, first power means for operating said conveyor to propel the carton blank and the overlying stack longitudinally therealong, a swingable folder disposed along said conveyor below the level of said carton blank and having a pivotal support with an axis substantially parallel to the longitudinal direction of said conveyor, said folder having a frame with a folding member thereon swingable about said pivotal support and movable upwardly past one side of the stack and then across the top of the stack for folding the side panel and the top panel of the carton blank against the side and top of the stack,
second power means for swinging said folder, an adhesive applicator for applying adhesive to one of the closure flaps of the carton blank, additional folding means for folding the second closure flap upwardly while folding the first closure flap downwardly with the adhesive therebetween to form the other side of the carton, and pressing means for pressing the closure flaps together so that the adhesive will form a bond therebetween, said adhesive applicator comprising a roller alongside the longitudinal conveyor and projecting upwardly to apply the adhesive to the underside of the second closure flap on the carton blank, said adhesive applicator comprising a receptacle for supplying the adhesive to said roller, said receptacle having a heater for maintaining the adhesive in a fluid state, power means for rotating said roller, and a slip clutch connected between said power means and said roller.

18. A machine according to claim 1, in which said pressing means comprise a series of movable rollers for engaging the closure flaps, and springs for pressing said rollers against the closure flaps.

19. A machine according to claim 1, including a series of horizontal rollers for pressing the top panel of the carton blank against the top of the stack, said pressing means including a series of vertical rollers for pressing the closure flaps against the side of the stack.

20. A machine according to claim 1, including a delivery conveyor for moving the folded carton blank and the stack transversely off said longitudinal conveyor, and fifth power means for actuating said delivery conveyor.

21. A machine according to claim 20, including additional control means disposed along the longitudinal conveyor and operable by the movement of said carton blank therealong for actuating said fifth power means.

22. A machine according to claim 20, including a control switch disposed along said longitudinal conveyor and operable by the movement of the carton blank therealong for actuating said fifth power means.

References Cited

UNITED STATES PATENTS

| | | | |
|---|---|---|---|
| 2,027,381 | 1/1936 | Hawker | 93—55.1 X |
| 2,634,563 | 4/1953 | Magill | 93—55.1 |
| 2,737,002 | 3/1956 | Demler | 53—209 |
| 2,814,240 | 11/1957 | Kuchler | 93—55.1 |
| 2,917,876 | 12/1959 | Clapp | 53—289 X |
| 2,919,526 | 1/1960 | Arneson | 53—209 X |
| 3,069,980 | 12/1962 | Kendall | 93—55.1 |
| 3,227,354 | 1/1966 | Gunyou | 229—23 |
| 3,315,435 | 4/1967 | Gunyou | 53—124 X |
| 3,354,600 | 11/1967 | Hoffman | 53—124 X |
| 3,383,825 | 5/1968 | Titchenal | 53—124 X |
| 3,392,638 | 7/1968 | Reineman | 93—84 |
| 3,398,675 | 8/1968 | Potter | 53—124 X |
| 3,406,494 | 10/1968 | Beck | 53—124 X |
| 586,327 | 7/1897 | Agnew | 53—64 X |
| 1,965,214 | 7/1934 | Bishop | 93—93 |
| 2,627,153 | 2/1953 | Stencil | 93—93 |
| 2,718,738 | 9/1955 | Mast | 53—64 |
| 3,347,205 | 10/1967 | Dobbyn | 93—36 |

WAYNE A. MORSE, JR., Primary Examiner

U.S. Cl. X.R.

53—124, 209, 289; 93—36, 49